US011609087B2

(12) United States Patent
Illes et al.

(10) Patent No.: US 11,609,087 B2
(45) Date of Patent: Mar. 21, 2023

(54) 360 DEGREE OPTICAL MEASURING DEVICE (71) Applicant: West Pharmaceutical Services, Inc., Exton, PA (US)

(72) Inventors: Steve Illes, Exton, PA (US); Ravi Patel, Exton, PA (US)

(73) Assignee: West Pharmaceutical Services, Inc., Exton, PA (US)

(*) Notice: Subject to any disclaimer, the term of this patent is extended or adjusted under 35 U.S.C. 154(b) by 0 days.

(21) Appl. No.: 17/049,219

(22) PCT Filed: Sep. 5, 2019

(86) PCT No.: PCT/US2019/049712
§ 371 (c)(1),
(2) Date: Oct. 20, 2020

(87) PCT Pub. No.: WO2020/051308
PCT Pub. Date: Mar. 12, 2020

(65) Prior Publication Data
US 2021/0239461 A1    Aug. 5, 2021

Related U.S. Application Data (60) Provisional application No. 62/727,872, filed on Sep. 6, 2018.

(51) Int. Cl.
*G01B 11/24* (2006.01)
*G01B 11/02* (2006.01)

(52) U.S. Cl.
CPC ........ *G01B 11/2408* (2013.01); *G01B 11/028* (2013.01); *G01B 11/2433* (2013.01); *G05B 2219/37339* (2013.01)

(58) Field of Classification Search
None
See application file for complete search history.

(56) References Cited

U.S. PATENT DOCUMENTS 5,005,978 A    4/1991    Skunes et al.
6,273,783 B1 *  8/2001    Kim .......................... B24B 5/04
                                                              451/8

(Continued)

FOREIGN PATENT DOCUMENTS

GB          2058344 A       4/1981

OTHER PUBLICATIONS

Keyence Corporation: High-speed, High-accuracy Digital Micrometer The Original Green LED Incorporated Digital Micrometer, Dec. 2006.

(Continued)

*Primary Examiner* — Michael P LaPage
(74) *Attorney, Agent, or Firm* — Blank Rome LLP (57) ABSTRACT Methods and systems for measuring a component of a drug delivery or storage device are described. The method comprises providing a light source in an opposing relationship with an optical imaging sensor; positioning a sample component on a positioning stage located between the at least one light source and at least one opposing optical imaging sensor; and illuminating, with the at least one light source, the sample component. The controller is operable to capture an image of the component, determine the location of a first outer edge point PI of the captured image; rotate the sample component relative to the optical image sensor, and collect n images separated from each other by x degrees of rotation, wherein n*x is ≥360 degrees. The controller may compare a measured position of the at least one outer edge point PI between the captured images to determine a degree or circular runout.

20 Claims, 10 Drawing Sheets

(56) References Cited

U.S. PATENT DOCUMENTS

| | | | |
|---|---|---|---|
| 8,307,528 B2* | 11/2012 | DeRoche | G01B 5/0002 |
| | | | 29/407.05 |
| 2002/0077770 A1 | 6/2002 | Kaminski et al. | |
| 2005/0271263 A1* | 12/2005 | Ito | G06T 7/001 |
| | | | 382/152 |
| 2006/0203254 A1* | 9/2006 | Sheiman | G01B 11/272 |
| | | | 356/625 |
| 2011/0283847 A1* | 11/2011 | Schreiber | G01B 5/08 |
| | | | 82/152 |
| 2012/0267031 A1* | 10/2012 | Mawby | B29D 30/0061 |
| | | | 156/64 |
| 2014/0038222 A1 | 2/2014 | Alt et al. | |
| 2015/0241207 A1 | 8/2015 | Crowther | |
| 2017/0170637 A1* | 6/2017 | Kominami | G01B 11/08 |
| 2017/0307541 A1* | 10/2017 | Offenborn | G01N 21/8901 |
| 2019/0212133 A1* | 7/2019 | Briscoe | G01B 11/2408 |

OTHER PUBLICATIONS

Keyence Corporation: 16,000 Hz sampling rate High-speed optical micrometer LS-9000 Series A New High Precision Micrometer System LS-9000 Series, Dec. 2014.

Int'l Search Report and Written Opinion dated Nov. 29, 2019 in Int'l Application No. PCT/US2019/049712.

Informal Communication by Telephone with the Applicant dated Jul. 23, 2020 in Int'l Application No. PCT/US2019/049712.

\* cited by examiner

| Gage R&R (Prior art ⌀13mm) | | |
|---|---|---|
| Source | Var Comp | % Contribution (of VarComp) |
| Total Gage R&R | 0.0000015 | 32.65 |
|   Repeatability | 0.0000004 | 8.12 |
|   Reproducibility | 0.0000011 | 24.53 |
|     Operators | 0.0000002 | 4.41 |
|     Operators* Parts | 0.0000009 | 20.12 |
| Part-to-part | 0.0000031 | 67.35 |
| Total Variation | 0.0000046 | 100.00 |
| | | |
| Process tolerance | 0.02 | |

| Source | StdDev (SD) | Study Var (6 * SD) | % StudyVar (%SV) | % Tolerance (SV/Toler) |
|---|---|---|---|---|
| Total Gage R&R | 0.0012280 | 0.0073681 | 57.14 | 36.84 |
|   Repeatability | 0.0006123 | 0.0036737 | 28.49 | 18.37 |
|   Reproducibility | 0.0010645 | 0.0063870 | 49.53 | 31.93 |
|     Operators | 0.0004513 | 0.0027078 | 21.00 | 13.54 |
|     Operators* Parts | 0.0009641 | 0.0057846 | 44.86 | 28.92 |
| Part-to-part | 0.0017638 | 0.0105826 | 82.07 | 52.91 |
| Total Variation | 0.0021492 | 0.0128950 | 100.00 | 64.48 |
| | | | | |
| Number of Distinct Categories | 2 | | | |

| Gage R&R (360 OMD - 13 mm) | | |
|---|---|---|
| Source | VarComp | % Contribution (of VarComp) |
| Total Gage R&R | 0.0001270 | 3.14 |
|   Repeatability | 0.0001270 | 3.14 |
|   Reproducibility | 0.0000000 | 0.00 |
|     Operators | 0.0000000 | 0.00 |
| Part-to-part | 0.0039155 | 96.86 |
| Total Variation | 0.0040425 | 100.00 |
| | | |
| Upper process tolerance limit | 0.51 | |

| Source | StdDev (SD) | Study Var (6 * SD) | % StudyVar (%SV) | % Tolerance (SV/Toler) |
|---|---|---|---|---|
| Total Gage R&R | 0.0112713 | 0.067628 | 17.73 | 11.28 |
|   Repeatability | 0.0112713 | 0.067628 | 17.73 | 11.28 |
|   Reproducibility | 0.0000000 | 0.000000 | 0.00 | 0.00 |
|     Operators | 0.0000000 | 0.000000 | 0.00 | 0.00 |
| Part-to-part | 0.0625736 | 0.375442 | 98.42 | 62.65 |
| Total Variation | 0.0635807 | 0.381484 | 100.00 | 63.65 |
| | | | | |
| Number of Distinct Categories | 7 | | | |

| Gage R&R (Prior art ☐20mm) | | |
|---|---|---|
| Source | Var Comp | % Contribution (of VarComp) |
| Total Gage R&R | 0.0000039 | 71.37 |
|   Repeatability | 0.0000023 | 42.17 |
|   Reproducibility | 0.0000016 | 29.20 |
|     Operators | 0.0000000 | 0.00 |
|     Operators* Parts | 0.0000016 | 29.20 |
| Part-to-part | 0.0000016 | 28.63 |
| Total Variation | 0.0000055 | 100.00 |
| | | |
| Upper process tolerance limit | 0.02 | |

| Source | StdDev (SD) | Study Var (6 * SD) | % StudyVar (%SV) | % Tolerance (SV/Toler) |
|---|---|---|---|---|
| Total Gage R&R | 0.0019789 | 0.0118736 | 84.48 | 46.69 |
|   Repeatability | 0.0015211 | 0.0091269 | 64.94 | 35.89 |
|   Reproducibility | 0.0012658 | 0.0075948 | 54.04 | 29.86 |
|     Operators | 0.0000000 | 0.0000000 | 0.00 | 0.00 |
|     Operators*Parts | 0.0012658 | 0.0075948 | 54.04 | 29.86 |

| Gage R&R (360 OMD ☐20mm) | | |
|---|---|---|
| Source | VarComp | % Contribution (of VarComp) |
| Total Gage R&R | 0.0002564 | 5.90 |
|   Repeatability | 0.0001408 | 3.24 |
|   Reproducibility | 0.0001156 | 2.66 |
|     Operators | 0.0000000 | 0.00 |
|     Operators* Parts | 0.0001156 | 2.66 |
| Part-to-part | 0.0040900 | 94.10 |
| Total Variation | 0.0043464 | 100.00 |
| | | |
| Upper process tolerance limit | 0.51 | |

| Source | StdDev (SD) | StudyVar (6 * SD) | % StudyVar (%SV) | % Tolerance (SV/Toler) |
|---|---|---|---|---|
| Total Gage R&R | 0.0160130 | 0.096078 | 24.29 | 12.31 |
|   Repeatability | 0.0118664 | 0.071199 | 18.00 | 9.12 |
|   Reproducibility | 0.0107519 | 0.064512 | 16.31 | 8.27 |
|     Operators | 0.0000000 | 0.000000 | 0.00 | 0.00 |
|     Operators*Parts | 0.0107519 | 0.064512 | 16.31 | 8.27 |
| Part-to-part | 0.0639530 | 0.383718 | 97.01 | 49.16 |
| Total Variation | 0.0659272 | 0.395563 | 100.00 | 50.68 |
| | | | | |
| Number of Distinct Categories | 5 | | | |

360 DEGREE OPTICAL MEASURING DEVICE

CROSS-REFERENCE TO RELATED APPLICATIONS

This application is a section 371 of International Application No. PCT/US2019/049712, filed Sep. 5, 2019, which was published on Mar. 12, 2020 under International Publication No. WO 2020/051308 A1, and which claims priority to U.S. Provisional Patent Application No. 62/727,872, filed Sep. 6, 2018, the contents of each of which are incorporated herein by reference.

TECHNICAL FIELD

The invention relates to methods and systems for measuring component parts, more specifically, component parts of drug delivery devices or drug storage solutions. In particular, the present invention is directed to devices, systems and methods for optically measuring one or more dimensions of a sample object of interest, in particular a syringe stopper, plunger, or piston, in 360 degrees. The systems and methods may be used to determine a degree of circular runout or concentricity of molded component parts.

BACKGROUND

Non-rigid molded parts for medical devices, such as syringes, require proper alignment of the top and bottom cavities of a molding tool. Improper alignment has the potential to yield not only line feeding/production issues for stoppers and plungers, but also functional issues once the item in question has been seated or inserted in an assembled device. For example, poorly aligned stoppers and plungers may result in a poor fit within a syringe barrel or container, leading to unreliable operation of the device, or a poor seal between sealing components.

To quantitatively assess the proper alignment of manufactured components, a measurement of circular runout/concentricity has to be completed. However, some existing systems may yield data that is too variable to provide an accurate and precise sample measurement output, and it may be time consuming to perform the measurements to obtain such data.

Concentricity (or circular runout) in this context refers to whether the actual centerlines of various parts of a sample, such as a stopper, overlap one another. If the centerlines deviate from one another in a straight line distance (i.e., the centerlines are parallel but offset from one another), the sample exhibits eccentricity, which is equal to the offset distance. Total circular runout is generally determined by locating the maximum and minimum distance between perimeters of two shapes intended to have coincident longitudinal axes and calculating the absolute value of the difference therefrom.

SUMMARY

The present invention includes methods and systems that may provide for improved measurement of molded parts, in particular circular runout or concentricity.

In a first aspect of the invention there is provided a method for measuring a component of a drug delivery or storage device, the method comprising: (i) providing a light source in an opposing relationship with an optical imaging sensor, wherein the light source and the optical imaging sensor are arranged such that a light path is defined between the light source and the optical imaging sensor such that light emitted from the light source impinges upon at least a portion of the optical imaging sensor; (ii) positioning a sample component on a sample positioning stage located in the light path extending between the at least one light source and at least one opposing optical imaging sensor; (iii) illuminating, with the at least one light source, the sample component; (iv) capturing, with the at least one optical imaging sensor, an image of the component. The image captured by the component is preferably a 2D image.

The method further comprises steps: (v) determining the location of a first outer edge point P1 of the captured image; (vi) rotating the sample component relative to the optical image sensor and the light source through a predetermined rotational distance x; (vii) repeating step (v) and (vi) to collect a total of n images, separated from each other by x degrees of rotation of the sample component, wherein n*x greater than or equal to 360 degrees; and (viii) comparing a measured position of the at least one outer edge point P1 between the captured images.

By measuring a difference in the position between the edge points P1, a degree of circular runout can be determined for the part. Circular runout may be indicative of mold misalignment and/or degradation. Measurements made using the method disclosed herein may therefore be used to indicate a mold condition. Improved measurement of parameters indicative of mold condition may in turn inform replacement or realignment of mold parts and provide for improved quality control of high volume part manufacturing.

In at least one embodiment, the image captured by the sensor is a silhouette of the sample component. The silhouette is formed by the sample component preventing light from the light source from impinging on the sensor in the region behind the sample component. It will be understood that the term 'behind' is used with reference to the light source, and is therefore the region between the component part and the optical sensor in the direction of the light path.

The method may further comprise the steps of: determining, based on step (viii), one or more of: a degree of concentricity of the sample component; a degree of cylindricity of the sample component; a circular runout of a cross-section of the sample component; and/or a total circular runout of the sample component.

In at least one embodiment, the method may further comprise: identifying the outer edge point P1 of the component at a first position, and identifying a second outer edge point P2 of the component at a second position; and determining a transverse distance D1 between P1 and P2 in each image. The first position and the second position are separated from each other in the longitudinal direction. A difference in the distance D1 can therefore be used to determine concentricity (or offset) between a cross-section of the part at the first location and a cross-section of the part at the second location.

The interval x between captured images is preferably less than 15 degrees, more preferably less than 10 degrees, more preferably less than 5 degrees, and more preferably approximately 2 degrees. It will be understood that the total number of captured images $n \geq 360/x$, e.g. when x=2 degrees, $n \geq 180$, when x=5 degrees, $n \geq 72$, when x=10 degrees, $n \geq 36$, etc.

Advantageously, the light source may be collimated. By providing a collimated light source, the resolution of the silhouette cast on the sensor may be improved, and the outer edge of the silhouette may be more accurately determined by the controller.

Advantageously, the method may further comprise automated picking of a part from an assembly or manufacturing line, and automated placement of the sample part on the sample presentation stage, e.g. by a robotic arm. Such a method may allow for automated monitoring of circular runout with a view to monitoring mold performance.

Optionally, the method can further comprise: determining one or more measured values representative of: a degree of concentricity of the sample component; a degree of cylindricity of the sample component; a circular runout of the sample component; or a total circular runout of the sample component, and comparing the one or more measured values to a predetermined threshold value to determine whether a mold part should be repaired or replaced.

In at least some embodiments, the method can further comprise: determining a first measured value representative of at least one of a degree of concentricity of the sample component, a degree of cylindricity of the sample component, circular runout of a cross-section of the sample component; and total circular runout of a first sample component; identifying a mold associated with the first sample component; determining a second measured value representative of at least one of a degree of concentricity of the sample component, a degree of cylindricity of the sample component, circular runout of a cross-section of the sample component; and total circular runout of a second sample component, wherein the second sample component is identified as being from the same mold as the first sample component; comparing the first measured value to the second measured value; and, optionally, identifying deterioration of the mold based on comparison of the first value and the second value.

In a second aspect of the invention, there is provided a system for measuring a component of a drug delivery or storage device, the system comprising: a light source for illuminating a sample component from a first side; an optical imaging sensor positioned opposite the light source, configured to capture a 2D image of the component; a sample positioning stage located between the optical imaging sensor and the light source for positioning the component between the optical imaging sensor and the light source; a motor configured to rotate the sample positioning stage relative to the optical imaging sensor and the light source; and a controller configured to: (i) control capture of a first image of the sample component; (ii) determine the location of a first outer edge point P1 of the captured image; (iii) rotate the sample component relative to the optical image sensor and the light source through a predetermined rotational distance x; repeat step (i) and (ii) to collect a total of n images, separated from each other by x degrees of rotation of the sample component, wherein $n*x \geq 360$ degrees; (v) compare a measured position of the at least one outer edge point P1 between the captured images.

The light source may be an LED light source. The light source may be collimated. The system may further comprise a collimator configured to collimate the light source. The collimator may be configured to produce a parallel beam of rays or radiation from the light source.

The controller may be configured to determine, based on step (v), one or more of: a degree of concentricity of the sample component; a degree of cylindricity of the sample component; a circular runout of a cross-section of the sample component; and a total circular runout of the sample component.

The controller may be further configured to identify the outer edge point P1 of the component at a first position, and identify a second outer edge point P2 of the component at a second position; and determine a transverse distance D1 between P1 and P2 in each image. The first position and the second position may be separated from each other in the longitudinal direction.

The sample positioning stage may be configured to rotate about a rotational axis, and wherein the stage may further comprise an alignment feature for locating the sample component in alignment with the rotational axis.

The sample positioning stage may comprise a post configured to support a piston or stopper, and wherein the post optionally comprises a receiving portion, e.g. a recess configured to receive a portion of a piston or stopper.

The sample presentation stage may comprise a dock configured to receive interchangeable component mounts. This feature may allow accurate placement and alignment of a plurality of different parts without needing to reconfigure the position of the sample stage.

The controller may be configured to determine a degree of concentricity between two portions of a part, e.g. between a first cross-section of the part at the first location P1 and a cross-section of the part at the second location P2. The system may also be further configured to: compare the determined circular run out, total circular runout, concentricity, and/or cylindricity to a predetermined value; and determine whether a mold part or parts should be replaced based on a comparison of the determined value to the predetermined threshold value. The comparison of the measured value to the predetermined threshold value may be used to inform mold repair or replacement decisions. For example, the controller may be configured to determine when a mold part should be replaced when a threshold value is exceeded. The controller may be further configured to predict when a mold will exceed a predetermined threshold value and predict a remaining lifetime of a mold part based on the predicted value. The controller may be further configured to: determine a first measured value representative of at least one of a degree of concentricity of the sample component, a degree of cylindricity of the sample component, circular runout of a cross-section of the sample component; and total circular runout of a first sample component; identify a mold associated with the first sample component; determine a second measured value representative of at least one of a degree of concentricity of the sample component, a degree of cylindricity of the sample component, circular runout of a cross-section of the sample component; and total circular runout of a second sample component, wherein the second sample component is identified as being from the same mold as the first sample component; compare the first measured value to the second measured value; and, optionally, identify deterioration of the mold based on comparison of the first value and the second value.

By providing a system as described above, it may be possible to measure molded part parameters that are indicative of mold condition (e.g. misalignment and/or degradation). Systems and methods according to the present invention may also be more reliable and accurate than known systems and less sensitive to variation between operators and inherent in the measurement systems and methods.

These and further advantages will be apparent to the skilled person in light of the following disclosure.

BRIEF DESCRIPTION OF THE FIGURES

Embodiments of the present invention will now be described with reference to a number of non-limiting, exemplary embodiments, as shown in the following figures, in which.

DETAILED DESCRIPTION

Embodiments of the invention will now be described in the context of a number of exemplary systems and methods in which the invention may be implemented. Those skilled in the art will understand that the devices and methods described herein and illustrated in the accompanying drawings are non-limiting exemplary embodiments of the invention and that modifications may be made to the described embodiments without departing from the scope of the invention. The features illustrated or described in connection with one exemplary embodiment may be combined with features of other embodiments, or features and/or steps described herein may be replaced with structurally similar and/or functionally equivalent means or steps. Such modifications and variations are included within the scope of the present disclosure.

Moreover, the skilled person will understand that relative terminology used in the following description is used for convenience only, and is not intended to be limiting on the scope of the invention. For example, the terms such as "lower", "upper", "top", and "bottom" designate directions in the drawings to which reference is made. These terms are not intended to be limiting on the orientation of devices described herein. The terms "comprising" and "including" are used to refer to non-exhaustive lists of components or steps, and devices or methods according to the invention may include additional features or steps not listed in the claims or description.

Figure 1:
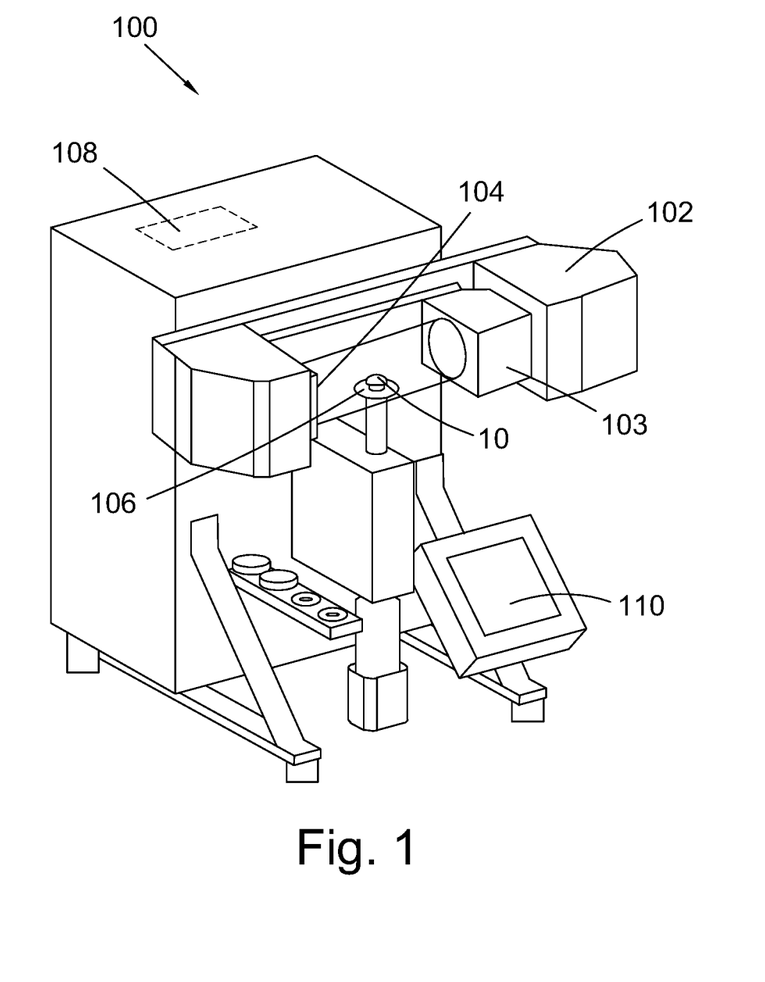
FIG. 1 shows a system for measuring a component part of a drug delivery or storage system according to a first embodiment.

Turning now to FIG. 1, a system 100 for measuring concentricity and/or runout of a sample component generally comprises at least one light source 102, an optical imaging sensor 104, a sample presentation system 106, and one or more controllers 108 (e.g., processors, CPUs, microcontrollers, ASICs, or the like) configured to control operation of the system. The sample presentation system 106 provides a stage on which a sample component 10 may be positioned between the optical imaging sensor 104 and the light source(s) 102. During operation, a sample 10 mounted on the stage 106 is illuminated by the light source(s) 102.

Since the sample part 10 is positioned between the light source 102 and the sensor 104 (which are configured in an opposing relationship), the part 10 casts a silhouette on the optical imaging sensor 104, which captures an image of the outline of the sample component 10.

The system 100 is configured to rotate the sample 10 relative to the light source(s) 102 and the optical imaging sensor 104 to present different views of the sample component 10 to the light source 102. It will be appreciated that the rotation of the sample component 10 is defined relative to the light source(s) 102 and optical imaging sensor 104. Therefore, the sample presentation stage 106 may be configured to rotate about a stage rotation axis to present different views of the sample component 10 to the light source(s) 102 and the optical imaging sensor 104. Alternatively, or additionally, the light source(s) 102 and the optical imaging sensor 104 may be configured to rotate around a stationary sample presentation system 106.

The system 100 may further include one or more display monitors 110 for viewing data, captured images, or the like, user interfaces (e.g., keyboard, mouse, touchscreen display, control panel, control pad, or the like), or the like. However, it will be appreciated that the display may be omitted.

Figure 2A:
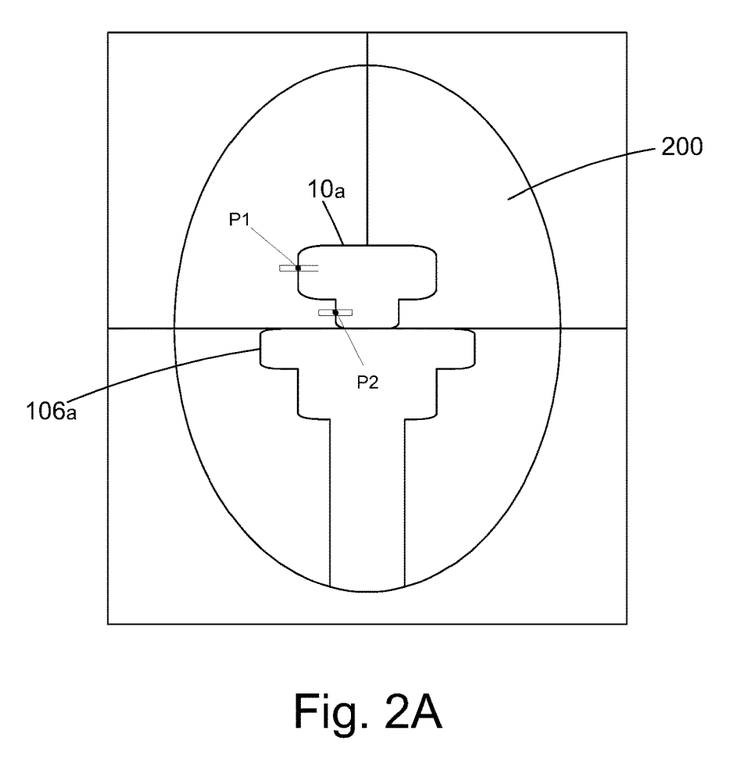
FIG. 2A shows an image captured by the system of FIG. 1.

FIG. 2A shows an example of an image captured by the optical imaging sensor 104. FIG. 2A shows the silhouette 10a, 106a formed by the sample component part 10 and the sample presentation stage 106 as captured by the image sensor 104. As shown in FIG. 2A, light from the light source 102 impinges upon the sensor 104 in region 200, except in the region where the light from the light source is blocked by the component part 10 and the sample presentation stage 106. Although FIG. 2A shows the captured image displayed on a screen 110, it will be appreciated by the skilled person that the methods and devices described herein may be carried out by the controller without displaying the captured images on a screen.

The system 100 is configured to measure one or more dimensions associated with the component part 10 for each rotational position of the part 10. For example, the system 100 may be configured to capture a first image, rotate the sample stage 106 by a first predetermined distance, before capturing a second image, and so on and so forth until images of the component have been captured or detected to measure the part in 360 degrees. In one example, images may be captured at 2 degree intervals, with 180 images captured in total. Images may also be captured at different intervals. For example, images may be captured with intervals up to 5 degrees between images, or up to 10 degrees.

The system 100 is further configured to take measurements of the component part 10 based on the captured or detected images. It will be appreciated that the images may be stored and measurements taken from the stored images, or the measurements may be taken and stored without storing captured images. In the context of the present application, the term 'captured' is used to cover images detected by the sensor 104, whether or not they are stored in an associated memory or storage device.

Various measurements may be taken with the system described above, and different parameters associated with the sample component part 10 may be determined based on these measurements, as will now be described with reference to FIG. 2B, which shows an enlarged view of the silhouette from FIG. 2A.

In a first embodiment, the system 100 can be configured to measure the circular runout of a sample component 10 by determining the location of a point P1 on an outer edge point of the component 10 at a first fixed longitudinal position, e.g.

a fixed longitudinal distance from an upper surface of the stage 106 or a fixed longitudinal position from a predetermined reference axis X on the sensor. Note that the longitudinal direction in the context of the present embodiment is the Y axis as depicted in FIGS. 2A and 2B. The edge of the part is defined as the edge of the silhouette captured by the optical image sensor, as shown in FIGS. 2A and 2B.

For a perfectly circular part rotated about its longitudinal axis Y, the location of the point P1 will not move relative to the axis Y as the part is rotated through 360 degrees. However, for a component part 10 having a non-circular cross-section, the location of the point P1 relative to the longitudinal axis Y will vary as the part rotates. The measured location of the point P1 as the part 10 rotates can be used to determine the degree of circular runout of the part at the first location.

The system may be further configured to determine the location of a second point P2 defined as an outer edge point of the component part at a second fixed longitudinal position, e.g. a fixed longitudinal distance from an upper surface of the stage 106 or the predetermined axis X. Measuring the location of a second point P2, allows measurement of circular runout at a second location on the component part 10 and, additionally or alternatively, a degree of concentricity of two sections of the part 10. For example, as shown in FIG. 2B, a first transverse distance D1 (measured in the x-direction) can be measured between the first point P1 and the second point P2. For a part 10 comprising perfectly concentric circular sections, the distance D1 will remain constant as the part 10 rotates. However, variation in the distance D1 as the part rotates indicates circular run out of one or both of the part and/or eccentricity of the sections. It will also be appreciated that further points P3, P4, P5, . . . Pn can be measured to provide further detailed information about the degree of runout, eccentricity, etc.

In some embodiments, the axis of rotation of the part 10 can be aligned with the axis of rotation of the stage 106, which may be aligned with axis Y. In such embodiments, the absolute location of the points P1, P2, . . . Pn on the captured images can be used to determine circular run out, concentricity, etc. In such embodiments, the sample presentation stage 106 preferably comprises one or more alignment features to allow the part 10 to be aligned with the axis of rotation of the stage 106.

In further embodiments, the system 100 can be configured to determine and correct for misalignment of the part 10 with the axis of rotation of the stage. One example of a system configured to determine and correct for misalignment of the part is the TM-3000 Series 2D Optical Micrometer supplied by KEYENCE CORPORATION of Osaka, Japan.

Referring again to FIG. 1, in at least one embodiment, the light source 102 includes one or more light emitting diodes (LEDs), the light from which is collimated and emitted toward the sample component 10. A collimator 103 may be positioned between the light source 102 and the mounting surface of the sample presentation system 106.

The optical imaging sensor 104 advantageously includes one or more CMOS image sensors placed behind the sample directly opposite to the light source 102. A light path between the light source 102 and the optical imaging sensor 104 preferably defines a viewing window. In a preferred embodiment, the light source 102 and the optical imaging sensor 104 are part of a TM-3000 Series 2D Optical Micrometer supplied by KEYENCE CORPORATION of Osaka, Japan, which also includes a controller for measuring and storing dimension data taken from images captured by the optical imaging sensor.

The sample presentation system 106 is preferably a stage that is rotatable with respect to the light source 102 and optical imaging sensor 104. The stage preferably includes a flat portion or mounting surface intersecting the light path such that a sample component 10 placed on the flat portion or mounting surface appears in the viewing window. For example, a stopper may be placed on the flat portion of the stage. For a piston, a post fixture may similarly be provided to support and move the piston in the viewing window. The stage and post fixture may be connectable with one another or interchangeably connected to a motor (such as a powered step motor or the like) or other device for effecting rotation. Preferably, operation of the motor is actuated or controlled by software running on one or more of the device controllers 108, as will be described in more detail below. The sample presentation stage 106 may be removably mounted in the system 100 such that it can be exchanged for a different mounting stage 106 configured to support a different part. This can allow different mounting stages 106 to be adapted to support different components.

The sample presentation system 106 is preferably positioned so that a sample component 10 is centered within the viewing window of the image sensor. However, software adjustments in the image measurement analysis may be utilized to correct for any misalignment from center. In this manner, the optical imaging sensor captures a silhouette of the sample, from which dimensional measurements can be obtained. Preferably, measurements are accurate down to the micron scale, although other tolerances may be used as necessary.

Figure 2B:
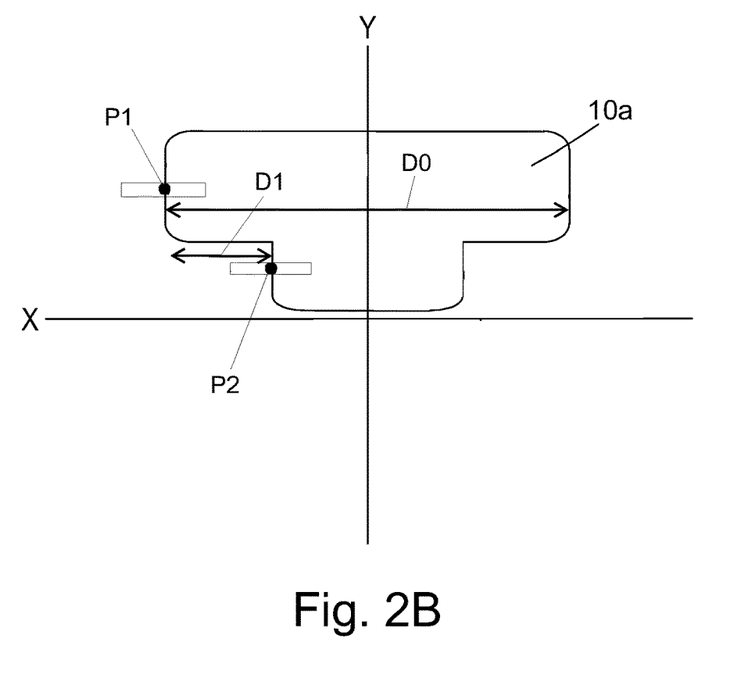
FIG. 2B shows an enlarged view of FIG. 2A in which exemplary dimensions that may be measured according to embodiments of the invention are marked.

In operation, a user utilizes a user interface to select particular locations on the sample for measurement (see e.g., FIG. 2B). For example, the user may select the outer edge of each of two portions of a stopper to determine the total circular runout of the part between the two portions P1, P2.

In the embodiment shown in FIGS. 2A and 2B, the component part 10 is a stopper comprising a first portion having a first diameter, and a second portion having a second diameter. However, it will be appreciated that the systems and methods described herein are suitable for use in measuring components having a constant diameter, or components have three or more different diameters. It will also be appreciated that the present invention may be employed for measuring components having variable diameter, whether the diameter varies with a smooth gradient, or in a stepped manner, or a combination of the two.

The system 100 is configured to rotate the sample through 360 degrees relative to the optical imaging sensor, capturing a plurality of discrete images as the sample rotates.

The user may also select a rotation speed for the sample presentation system 106 and how many images are to be acquired by the optical imaging sensor 104. In a preferred embodiment, the optical imaging sensor 104 is synchronized to capture an image of the sample 10 after every two degrees of rotation, thereby providing 180 discrete images. However, the system and method can be modified without departing from the scope of the invention to capture images at intervals smaller than every 2 degrees, or larger than every 2 degrees. The system may also be configured to capture images through more than 360 degrees, to provide a degree of overlap between the first images captured and the last images captured of the component. The overlapping images can be compared to verify that the component has not moved relative to its initial position.

The system 100 may operate in a stop-and-shoot mode (i.e., the sample presentation system 106 may stop rotating to allow each image capture) or the system 100 may be configured to capture each image while the sample presentation system is rotating. Still further, it is preferable that the rotation of the sample 10 and image capture all occur within about eight seconds. However, other intervals and speeds may be utilized depending on particular measurement needs, device capabilities, or the like.

Selected dimensions within the captured images are simultaneously or subsequently measured, for example by optical imaging sensor 104 or the controller 108. Individual measurements may include the position of a point P1 within the viewing window, a radial distance D0 measured in a transverse direction (x-direction) between diametrically opposed outer edges of the sample component 10. A plurality of outer edge points P1, P2, etc, may be measured and the transverse distance (e.g. D1) between the points P1, P2, P3, etc, may be measured (see, for example, D1 in FIG. 2B).

Variation in the location of the points P1, P2, etc., variation of the transverse distance between two points (e.g. the distance D1 between P1 and P2, as shown in FIG. 2B) can be measured as the component sample 10 rotates.

The measurements taken using the system described above can thereafter be operated upon further by one of the one or more controllers 108 to determine additional characteristics of the sample, such as concentricity/total circular runout, or the like. For example, in one embodiment, the TM-3000 exports the measurement data from each captured image to an EXCEL file, which includes a macroinstruction for calculating the total circular runout. A report bearing the part number may be created and saved.

The methods and systems described herein may also be used for quality control monitoring in a manufacturing or assembly line. For example, the present invention may be used to indirectly monitor mold degradation or misalignment, by measuring and monitoring circular run out of molded parts.

The system and methods described herein may comprise automatically picking and measuring a sample component part 10 from a manufacturing or assembly line and performing one or more of the measurements described above. The system may comprise, for example, a robotic arm to pick and place a component part on the sample stage for measurement. The controller may be configured to identify a part number, a batch number, or a mold identifier identifying the mold from which the part originated.

The controller 108 or an associated processor may be configured to issue an alert when the measured dimensions of a part exceed a predefined threshold value. For example, the system 100 may be configured to pick a component part 10 and measure the concentricity and/or the (total) circular run out of the picked molded part. Where the part is associated with a batch number of mold number, the alert may inform corrective action to be taken, or predict a timeframe in which corrective action should be taken.

The controller 108 may be further configured to measure the concentricity and/or total circular run out of the part and compare the measured value to a predefined threshold value and/or store the measured value in an associated memory. If the measured value exceeds the predefined threshold value a predetermined number of consecutive measurements (e.g. one or more, two or more, or three or more consecutive measurements), the system may issue an alert that the mold should be replaced. In some embodiments, the controller(s) 108 or a linked system may monitor the degradation of mold parts and predict lifespans and pre-empt replacement. Replacement of molds may be automated in combination with the system and methods described herein.

The device according to embodiments of the present invention allows the capability to capture a full profile perspective of a sample, greater resolution and consistency in measurement, and faster evaluations. Concentricity/total circular runout can also be measured simultaneously with other dimensional attributes observable in profile perspective (e.g., diameters, overall height, thickness, or the like). Thus devices in accordance with embodiments of the present invention can be used in place of multiple measurement systems.

In addition to providing systems and methods for measuring component parts with improved accuracy, and within an acceptable time frame, systems and methods described herein may provide multiple measurements with a measuring system with reduced scope for operator error and/or variation. The present invention may therefore provide a more reliable and more accurate measurement system compared to known systems and methods.

The repeatability and reproducibility of the system 100 described above with reference to FIG. 1 was compared to known measurement systems using a number of Gage R&R studies, as will now be described with reference to the following examples.

Gage R&R studies (e.g. Gage analysis of variance—ANOVA—random effects model used to assess a measurement system) are known in the art and measure the amount of variability induced in measurements by the measurement system itself. The induced variability is compared to the total variability observed to determine the viability of the measurement system. Such studies quantify the inherent variation in the measurement system by observing the variability between multiple measurements taken for different parts, and by different operators (and where applicable measurement tools). Such studies aim to determine the repeatability of a method of measurement, (wherein repeatability is the variation in results due to the measuring device, or the variation observed when the same operator measures the same part repeatedly with the same device) and the reproducibility of the method (wherein reproducibility is the variation due to use of the measuring system, or the variation observed when different operators measure the same part using the same device).

As will be described in more detail below, FIGS. 3-10 show the results of gage R&R studies for different stoppers measured using different measurement systems. For each study, multiple component parts (numbered 1, 2, 3, . . . n, etc.) and multiple operators (designated O1, O2, O3) were selected. Each operator measured each part three times, in a random order. The results are shown in FIGS. 3-10. Gage R&R studies are known in the art, and the results shown in FIGS. 3-10 will be understood by the skilled person. The following description summarises the results shown in FIGS. 3-10.

Figure 3:
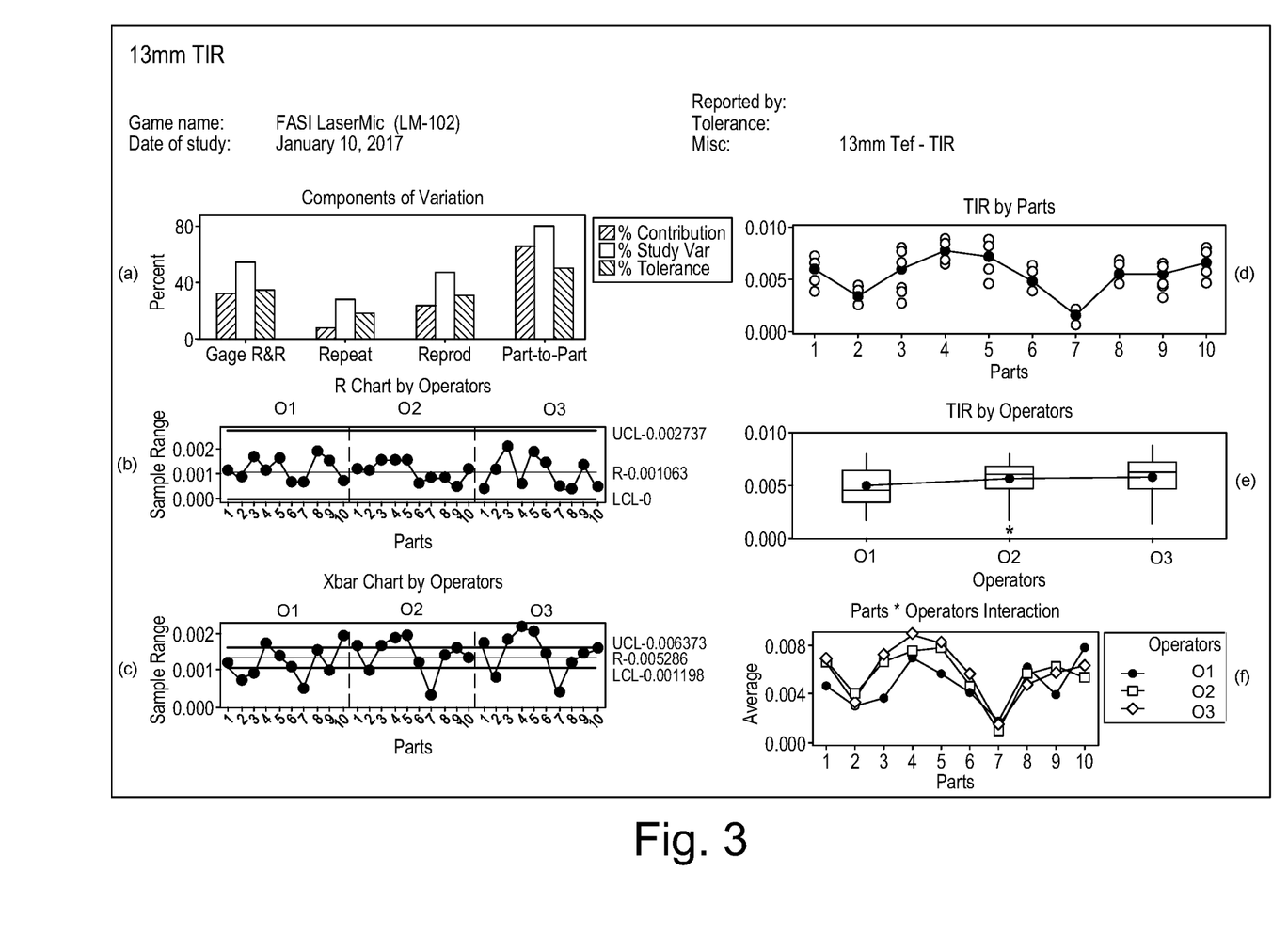
FIG. 3 shows a gage R&R study of a prior art measurement system used to measure a first component.
Figure 4:
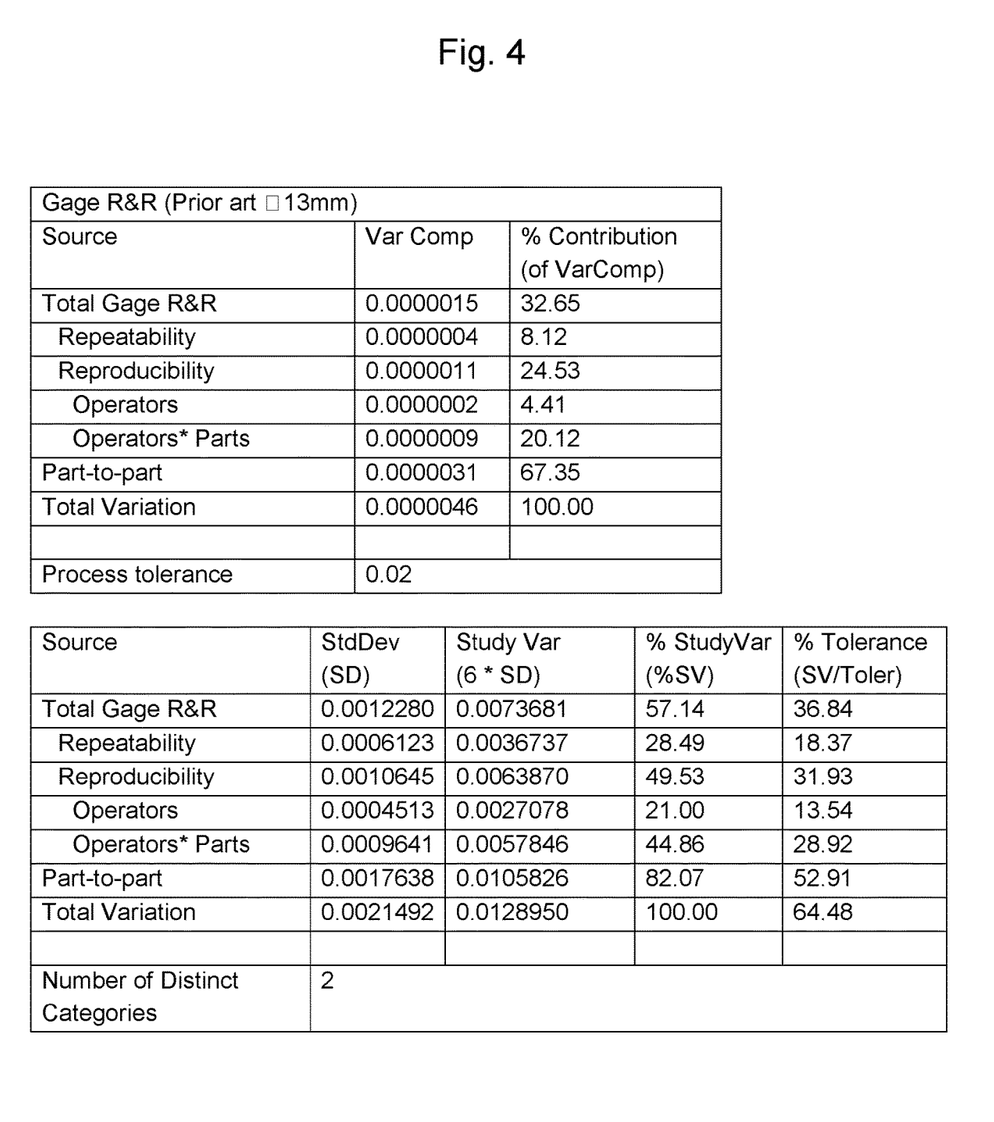
FIG. 4 shows a tabular summary of the results of the Gage R&R study shown in FIG. 3.

FIG. 3 shows the results of a gage R&R study for a 13 mm stopper using a known laser micrometer measurement system (referred to hereafter as test method A). FIG. 4 shows a tabular summary of the results of the Gage R&R study shown in FIG. 3.

Figure 5:
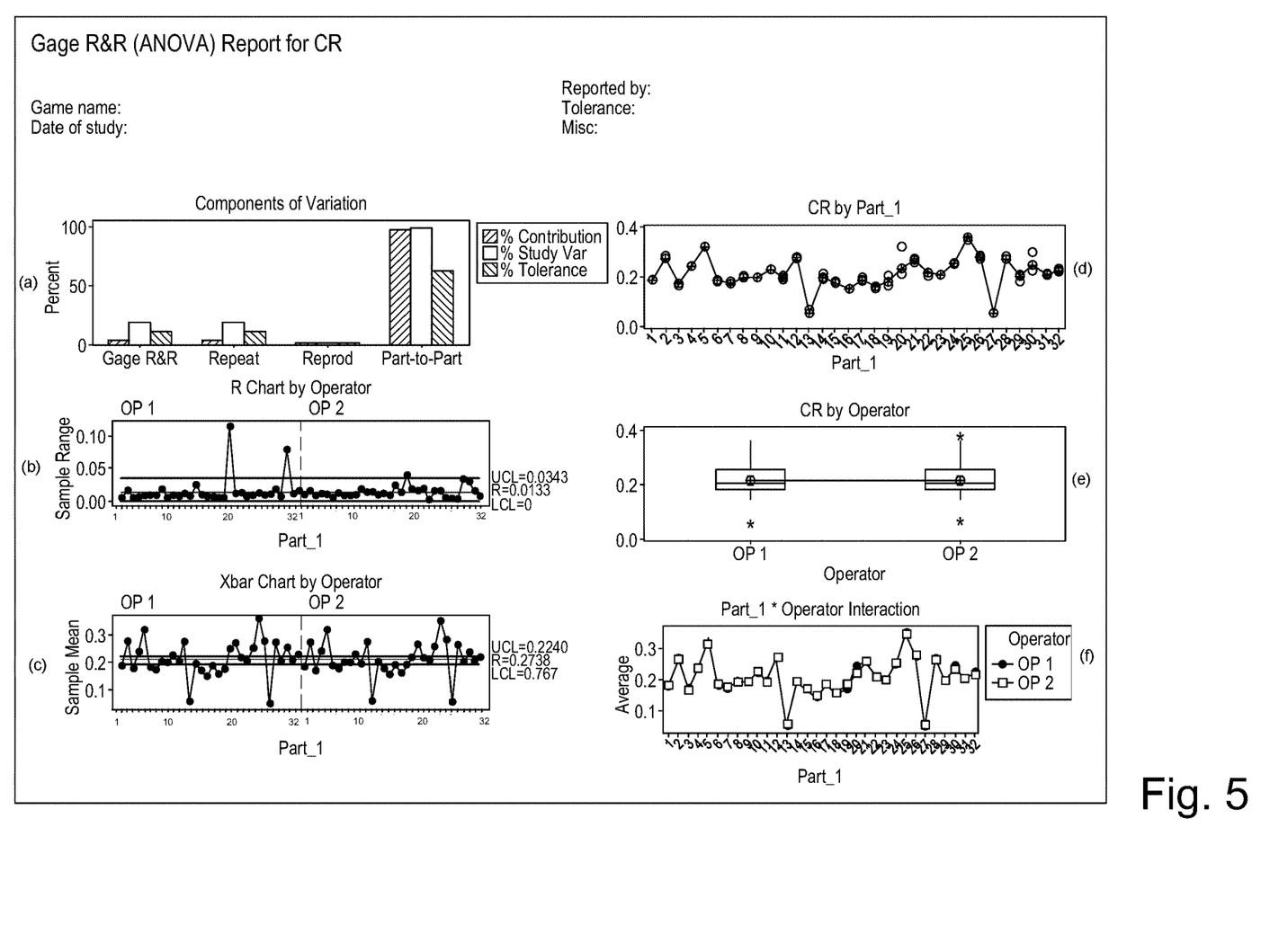
FIG. 5 shows a gage R&R study of a measurement system according to the invention used to measure the first component.
Figure 6:
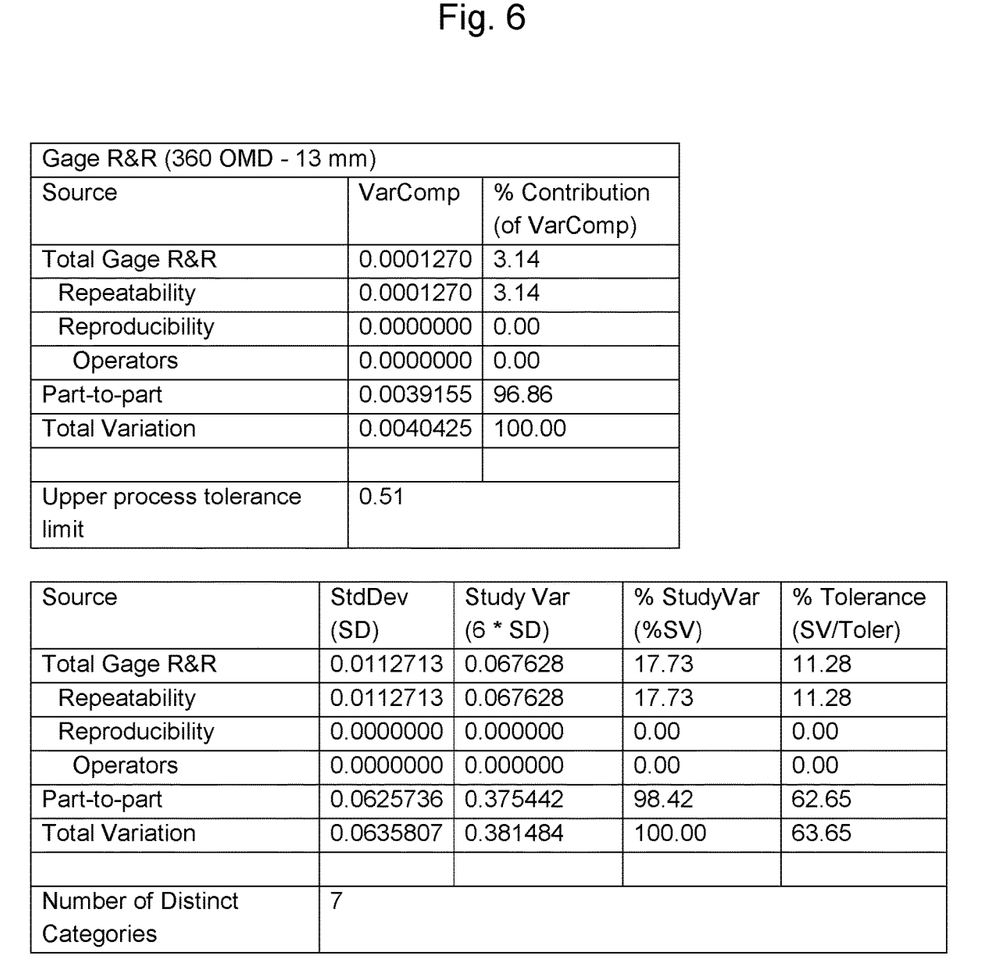
FIG. 6 shows a tabular summary of the results of the Gage R&R study shown in FIG. 5.

FIG. 5 shows the results of a gage R&R study for a 13 mm stopper using a measurement system and method according to an embodiment of the present invention (referred to hereafter as test method B). FIG. 6 shows a tabular summary of the results of the Gage R&R study shown in FIG. 5.

Figure 7:
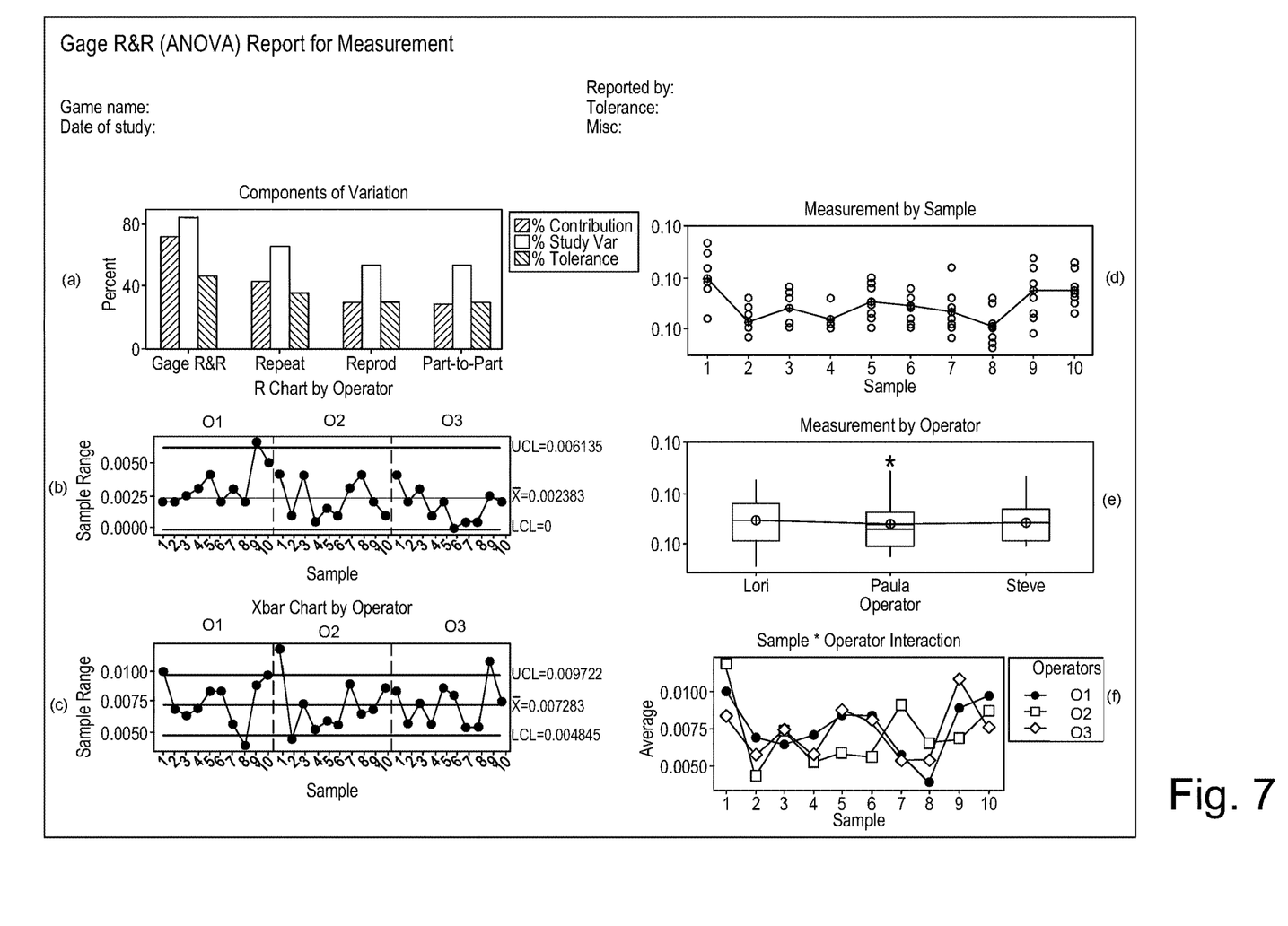
FIG. 7 shows a gage R&R study of the prior art measurement system used to measure a second component.
Figure 8:
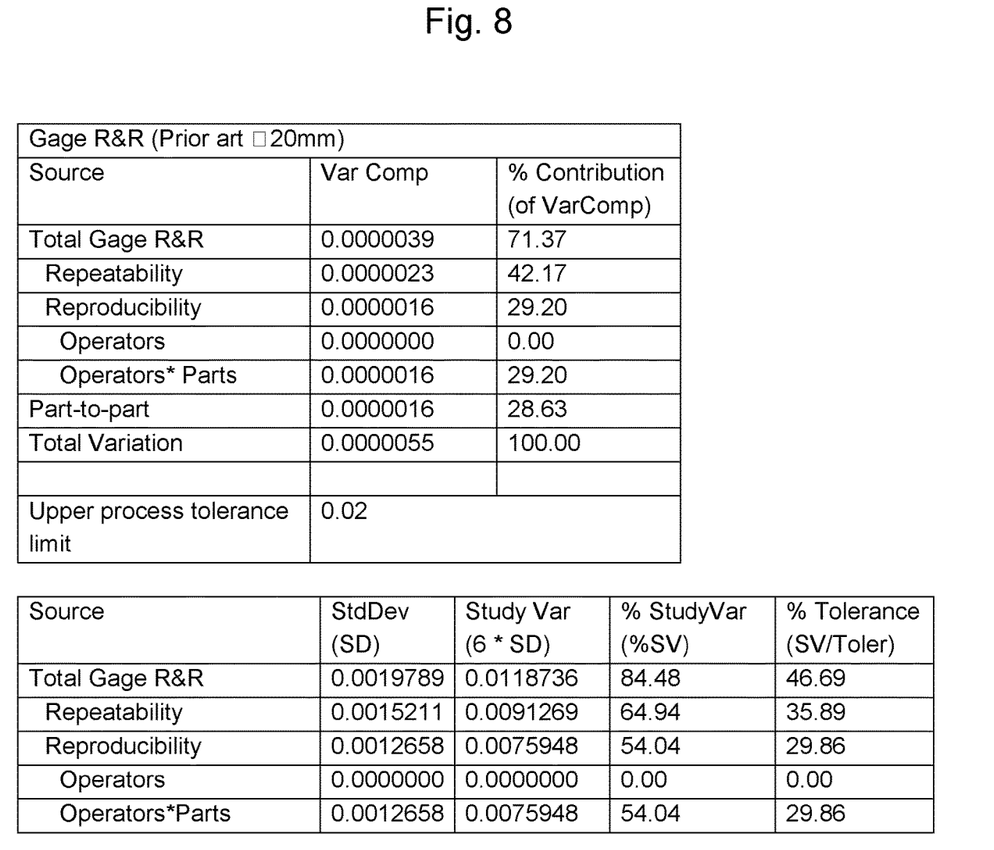
FIG. 8 shows a tabular summary of the results of the Gage R&R study shown in FIG. 7.

FIG. 7 shows the results of a gage R&R study for a 20 mm stopper using test method A. FIG. 8 shows a tabular summary of the results of the Gage R&R study shown in FIG. 7.

Figure 9:
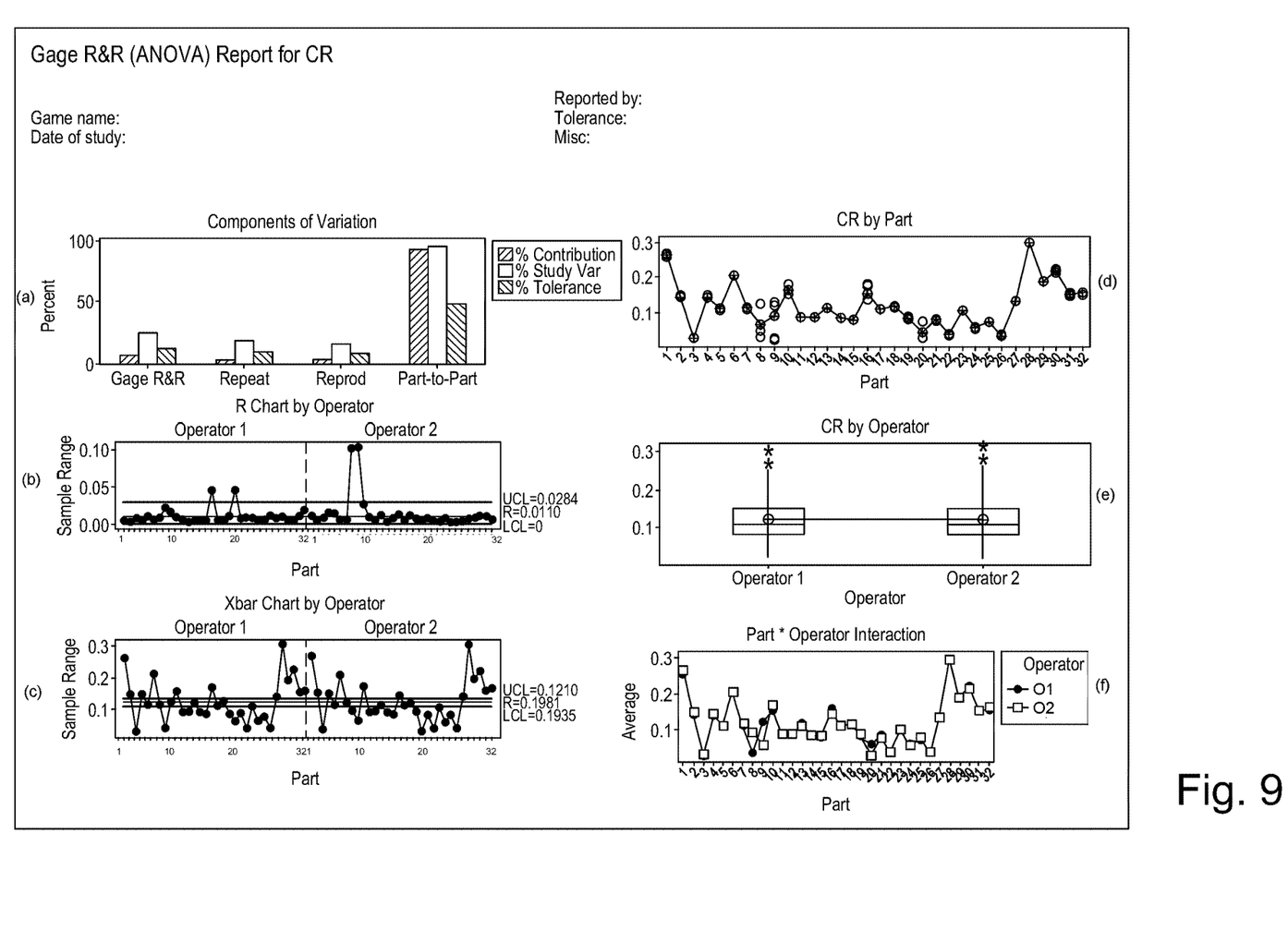
FIG. 9 shows a gage R&R study of a measurement system according to the invention used to measure the second component.
Figure 10:
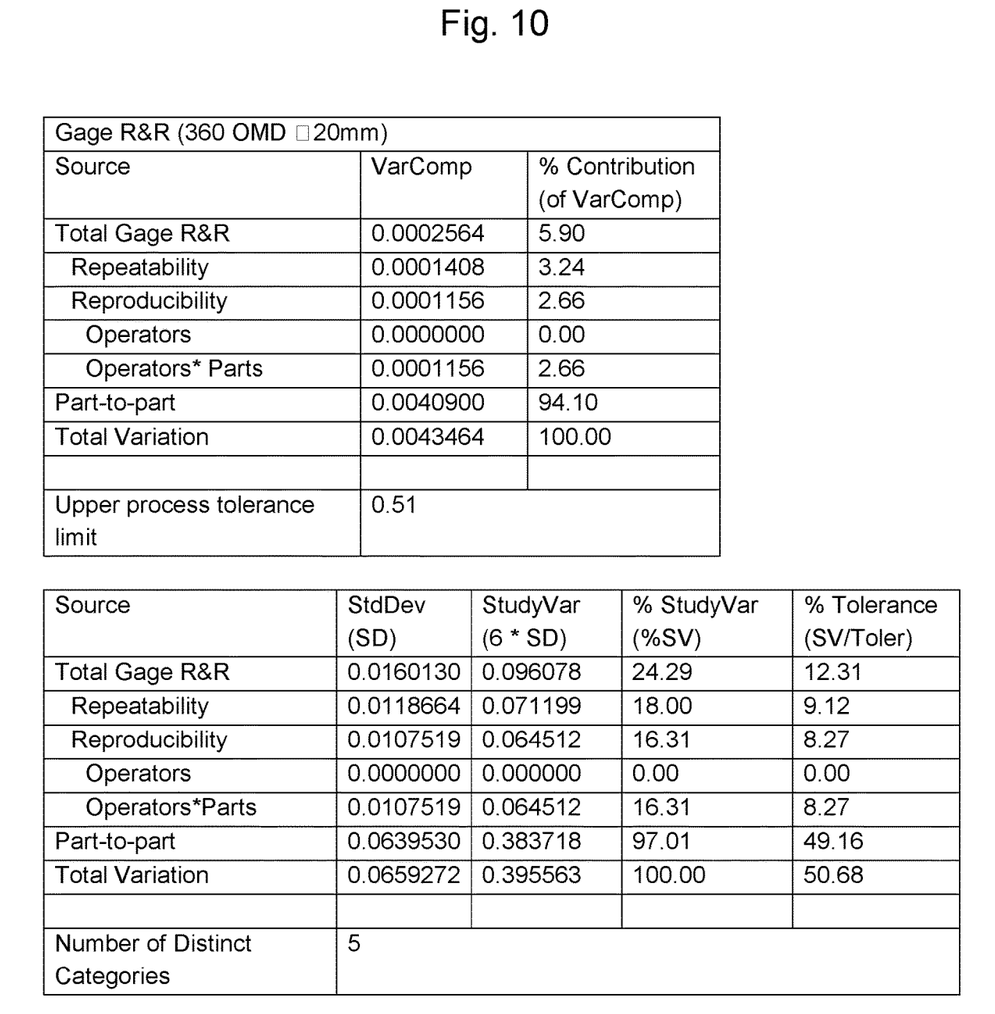
FIG. 10 shows a tabular summary of the results of the Gage R&R study shown in FIG. 9.

FIG. 9 shows the results of a gage R&R study for a 20 mm using method B, according to the present invention. FIG. 10 shows a tabular summary of the results of the Gage R&R study shown in FIG. 9.

Each of FIGS. 3, 5, 7 and 9, includes charts (a)-(e).

FIGS. 3(a), 5(a), 7(a), and 9(a) each shown the components of variation for different tests and/or samples: repeatability, reproducibility, part-to-part variation, and total gage R&R variation are grouped along the x-axis. The percentage contribution of each variable to the total variability, the percentage study variability, and the percentage tolerance is shown along the y-axis for each category.

FIGS. 3(b), 5(b), 7(b), and 9(b) show an R chart by operator, in which the consistency with which each operator measures parts can be seen.

FIGS. 3(c), 5(c), 7(c), and 9(c) show an Xbar chart by operator, which evaluates the part-to-part variation to the repeatability.

FIGS. 3(d), 5(d), 7(d), and 9(d) show a TIR ('total indicator reading' or 'full indicator movement') for each part.

FIGS. 3(e), 5(e), 7(e), and 9(e) show the TIR by operator.

FIGS. 3(f), 5(f), 7(f), and 9(f) show the part*operator interaction, illustrating the interaction between the variability of measurements taken by each operator and a particular part.

As shown in FIGS. 3 and 4, the total Gage R&R for 13 mm stoppers measured according to the known laser micrometer measurement method described above is 32.65%. The part-to-part contribution of the variation is 67.35%. According to the values shown in FIG. 4, the measurement system's inherent variability is therefore significant compared to the total variability between measured parts. The results show substantial variance component contributions from the process, including operator-to-operator reproducibility.

FIGS. 5 and 6 show the results of the Gage R&R study using an embodiment of the present invention as described above on 13 mm sized stoppers, and a significant reduction in contribution to variance from instrument and operator-related aspects is observed. As shown in FIG. 6, the contribution of the measurement system to the variability between measurements is 3.14%, whereas the contribution of part-to-part variability is 96.86%.

As shown in FIGS. 7 and 8, the results of the Gage R&R study for 20 mm stoppers measured according to known laser micrometry methods yielded an R&R contribution of 71.37%, and a part-to-part variability of 28.63%. The results show substantial variance component contributions from the process, including operator-to-operator reproducibility.

As shown in FIGS. 9 and 10, the results of the Gage R&R study for 20 mm stoppers according to the present invention, the R&R contribution to variability is 5.90%, whereas the variation attributable to part-to-part variation is 94.10%. Therefore, a significant reduction in contribution to variance from instrument and operator-related aspects is observed in the systems and methods according to the present invention, when compared to the prior art.

Embodiments of the present invention may be used in multiple applications in a production line. As one example, the device can be used for quality testing of molds from which stoppers or plungers are formed. Samples created by the mold may be measured to ensure that the mold is accurately producing stoppers/plungers with the desired dimensions and appropriate characteristics. In another example, the device can be used at an end of the production line for defect detection. In such applications, it may be advantageous to provide multiple devices to evaluate multiple samples and/or to hasten examination by imaging multiple viewing angles simultaneously. Variations can include a mirror system to allow for capture of multiple sides of the sample, for example.

In such embodiments, the sample presentation system 106 does not need to rotate through 360 degrees to capture images of the sample components through 360 degrees. In yet further embodiments, a plurality of optical imaging sensors and a plurality of light sources may be used to capture images of the sample component through 360 degrees. The skilled person will appreciate that additional mirrors, sensors and optical imaging sensors can be employed to capture 360 degree images without rotating the sample component through 360 degrees.

For example, the system 100 may comprise three optical imaging sensors 104, equally spaced (120 degrees apart) around the sample presentation system 106, and three light sources 104 diametrically opposed to each of the three optical imaging sensors 104.

The above-described operations may be performed by a single controller or may be distributed among multiple controllers.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the disclosure herein.

The invention claimed is:

1. A method for measuring a sample component of a drug delivery or storage device, the method comprising:
   providing a light source in an opposing relationship with an optical imaging sensor, wherein a light path is defined between the light source and the optical imaging sensor such that light emitted from the light source impinges upon at least a portion of the optical imaging sensor;
   positioning the sample component on a sample positioning stage located in the light path extending between the light source and the opposing optical imaging sensor;
   illuminating, with the light source, the sample component;
   capturing, with the optical imaging sensor, an image of the sample component;
   rotating the sample component relative to the optical image sensor and the light source through a predetermined rotational distance x in degrees;
   repeating the capturing step and the rotating step to collect n images, separated from each other by the rotational distance x with respect to the sample component, wherein n*x≥360 degrees;
   determining a location of an outer edge point at a fixed longitudinal position of the sample component in the images;
   comparing the locations of the outer edge points at the fixed longitudinal position between the images to each other to determine at least one dimension of the sample component; and
   determining whether at least a part of a mold that forms the sample component should be repaired or replaced, based on the at least one dimension and one or more predetermined threshold values.

2. The method of claim 1, wherein the images are of a silhouette of the sample component.

3. The method of claim 1, wherein the at least one dimension of the sample component includes one or more values of:
- a degree of concentricity of the sample component;
- a degree of cylindricity of the sample component;
- a circular runout of a cross-section of the sample component; and
- a total circular runout of the sample component.

4. The method of claim 3, further comprising comparing the one or more values to the one or more predetermined threshold values to determine whether the at least a part of the mold should be repaired or replaced.

5. The method of claim 1, further comprising:
- identifying a second outer edge point of the sample component in each image; and
- determining a transverse distance between the outer edge point and the second outer edge point in each image.

6. The method of claim 1, further comprising determining a degree of concentricity between a cross-section of the sample component at the outer edge point and a second cross-section of the sample component at a second outer edge point.

7. The method of claim 1, wherein the rotational distance x is less than 15 degrees.

8. The method of claim 1, wherein the light source is collimated.

9. The method of claim 1, further comprising:
- automatically picking up the sample component from an assembly or manufacturing line; and
- automatically placing the sample component on the sample positioning stage.

10. A method for measuring a sample component of a drug delivery or storage device, the method comprising:
- providing a light source in an opposing relationship with an optical imaging sensor, wherein a light path is defined between the light source and the optical imaging sensor such that light emitted from the light source impinges upon at least a portion of the optical imaging sensor;
- positioning the sample component on a sample positioning stage located in the light path extending between the light source and the opposing optical imaging sensor;
- illuminating, with the light source, the sample component;
- capturing, with the optical imaging sensor, an image of the sample component;
- rotating the sample component relative to the optical image sensor and the light source through a predetermined rotational distance x in degrees;
- repeating the capturing step and the rotating step to collect n images, separated from each other by the rotational distance x with respect to the sample component, wherein n*x≥360 degrees;
- determining a location of an outer edge point at a longitudinal position of the sample component in the images;
- comparing the locations of the outer edge points between the images;
- determining a first value of at least one of: a degree of concentricity of the sample component, a degree of cylindricity of the sample component, a circular runout of a cross-section of the sample component, or a total circular runout of the sample component;
- identifying a mold associated with the sample component;
- determining a second value of at least one of: a degree of concentricity of the sample component, a degree of cylindricity of the sample component, a circular runout of a cross-section of the sample component, or a total circular runout of a second sample component from the mold; and
- comparing the first value to the second value.

11. A system for measuring a sample component of a drug delivery or storage device, the system comprising:
- a light source for illuminating the sample component;
- an optical imaging sensor configured to capture an image of the sample component;
- a sample positioning stage configured to support the sample component between the optical imaging sensor and the light source;
- a motor configured to rotate the sample positioning stage relative to the optical imaging sensor and the light source; and
- a controller configured to:
  - capture of an image of the sample component;
  - rotate the sample component relative to the optical image sensor and the light source through a predetermined rotational distance x;
  - repeat the capture step and the rotate step to collect n images, separated from each other by the rotational distance x with respect to the sample component, wherein n*x≥360 degrees;
  - determine a location of an outer edge point at a fixed longitudinal position of the sample component in the images;
  - compare the locations of the outer edge points between the images to each other to determine at least one dimension of the sample component; and
  - determine whether at least a part of a mold that forms the sample component should be repaired or replaced, based on the at least a dimension and one or more predetermined values.

12. The system of claim 11, wherein the at least one dimension of the sample component includes one or more values of:
- a degree of concentricity of the sample component;
- a degree of cylindricity of the sample component;
- a circular runout of a cross-section of the sample component; and
- a total circular runout of the sample component.

13. The system of claim 12, wherein the controller is further configured to compare the one or more values to the one or more predetermined values to determine whether the at least a part of the mold should be repaired or replaced based on the comparison.

14. The system of claim 11, wherein the controller is further configured to:
- identify a second outer edge point at a second fixed longitudinal position of the sample component; and
- determine a transverse distance between the outer edge point and the second outer edge point in each image.

15. The system of claim 11, wherein the sample positioning stage is configured to rotate about a rotational axis R, and the sample positioning stage comprises an alignment feature for locating the sample component in alignment with the rotational axis R.

16. The system of claim 15, wherein the sample positioning stage comprises a post configured to support a piston, and the post comprises a piston receiving portion.

17. The system of claim 11, wherein the sample positioning stage comprises a dock configured to receive interchangeable component mounts.

18. The system of claim 11, wherein the controller is further configured to determine a degree of concentricity between a cross-section of the sample component at the outer edge point and a second cross-section of the sample component at a second outer edge point.

19. The system of claim 11, wherein the light source is collimated.

20. The system of claim 11,
wherein the at least one dimension of the sample component includes a first value of at least one of a degree of concentricity of the sample component, a degree of cylindricity of the sample component, circular runout of a cross-section of the sample component, or a total circular runout of the sample component, and
wherein controller is further configured to:
determine a second value of at least one of a degree of concentricity of the sample component, a degree of cylindricity of the sample component, a circular runout of a cross-section of the sample component, or a total circular runout of a second sample component from the mold; and
compare the first value to the second value.

* * * * *